No. 628,348. Patented July 4, 1899.
P. C. McILHINEY.
PROCESS OF ORNAMENTING METALS.
(Application filed Aug. 27, 1898.)

(No Model.)

WITNESSES:
INVENTOR
BY
ATTORNEYS.

UNITED STATES PATENT OFFICE.

PARKER C. McILHINEY, OF NEW YORK, N. Y., ASSIGNOR TO THE TIFFANY GLASS AND DECORATING COMPANY, OF SAME PLACE.

PROCESS OF ORNAMENTING METALS.

SPECIFICATION forming part of Letters Patent No. 628,348, dated July 4, 1899.

Application filed August 27, 1898. Serial No. 689,672. (No specimens.)

*To all whom it may concern:*

Be it known that I, PARKER C. McILHINEY, of the city of New York, borough of Manhattan, in the county and State of New York, have invented a new and Improved Process of Ornamenting Metals, of which the following is a full, clear, and exact description.

My invention relates to the ornamenting or decoration of metals after the fashion of inlaid work, and has for its object to enable such ornamentation to be produced with great ease and at little cost upon surfaces of various shapes, avoiding the loss of material entailed by the use of the customary processes.

To this end I proceed as fully described hereinafter, and specifically pointed out in the appended claims.

Reference is to be had to the accompanying drawings, forming a part of this specification, in which similar characters of reference indicate corresponding parts in all the figures.

Figure 1:
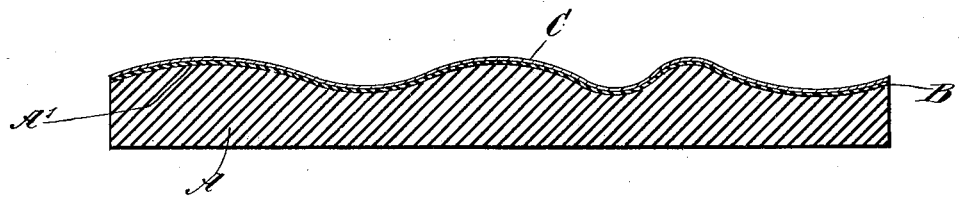
Figure 2:
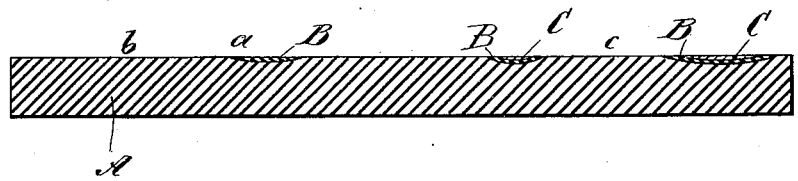
Figure 3:
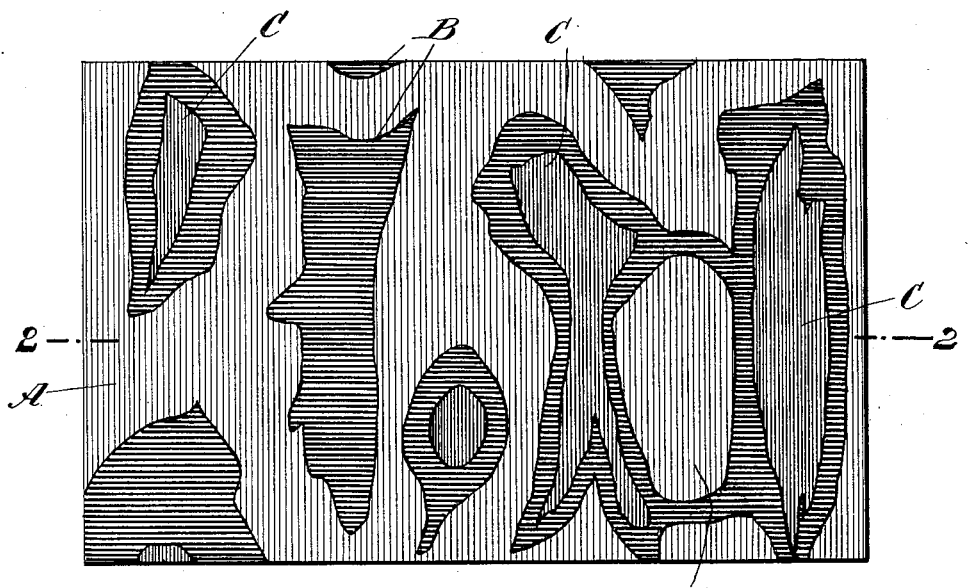

Figure 1 is a cross-section of an incomplete compound plate according to my invention. Fig. 2 shows the same plate in a finished condition, the section being taken on line 2 2 of Fig. 3; and Fig. 3 is a face view of the finished article.

The first step of my process consists in producing upon a backing, which is a metal plate, such as a copper plate A, an uneven surface A', having raised or depressed portions, or both, the shape of such portions corresponding to the design or pattern to be produced. The uneven surface may be produced in a great variety of manners—such as by etching, hammering, chasing, casting, or otherwise.

The second step of my process consists in electroplating the said uneven surface A' of the backing A with one or more coats of a different metal or metals. Thus in the example shown a first coat B—say of silver—is applied on the surface A' of the backing A, and on top of said coat I apply another coat C, which may be of gold. It will be obvious that the coats B and C will follow, substantially, the uneven form of the surface A', so that the uppermost layer C will have an uneven exposed surface, reproducing practically the irregularities of the surface A'. The coats B and C being applied by electroplating will adhere very strongly to each other and to the backing A. They may be made very thin, and consequently inexpensive.

The third step of my process consists in cutting down the uneven surface of the uppermost coating, the cutting being performed evenly all over said exposed surface, preferably in such a manner as to render such surface smooth, as shown in Fig. 2. This operation, according to the depth of the cut, will in some places, as at *a*, expose only the first (silver) layer B, while in other places, such as *b*, the backing A alone will be exposed, and in other places the backing will appear in exposed portions surrounded by a band or border formed by an exposed portion of the second layer C, as at *c*. The result will depend, as above stated, upon the thickness of the material removed and obviously also upon the dimension of the projections from the face A' of the backing A. The pattern ultimately resulting from the above-described manipulations can therefore be determined by giving the surface A' of the backing the appropriate shape, and this is much easier than to give such a shape to the compound plate, consisting of the backing A and the coats B C. Furthermore, there is no danger in my process of loosening the coats B C from the backing, as the cutting operation is the only one to which said coats are subjected.

The cutting down of the uneven exposed surface of the uppermost coat C may be accomplished in any suitable manner. Buffing, filing, or polishing are some of the expedients which may be employed for this purpose.

Having thus described my invention, I claim as new and desire to secure by Letters Patent—

1. The herein-described process of ornamenting metals, which consists in producing an uneven surface upon a metallic backing, electroplating said surface, and removing or cutting down portions of the plating, to expose the underlying material.

2. The herein-described process of ornamenting metals, which consists in producing an uneven surface upon a metallic backing, electroplating said surface, and removing or cutting down the plating and its backing until the surface is devoid of projections.

PARKER C. McILHINEY.

Witnesses:
A. H. LINCOLN,
JOHN OLMSTEAD.